(12) United States Patent
Pogue

(10) Patent No.: US 6,871,868 B2
(45) Date of Patent: Mar. 29, 2005

(54) POWER HITCH

(76) Inventor: Richard Pogue, Arrowhead Contractors Roofing Supply, 13 Guenther Blvd., St Peters, MO (US) 63376

( * ) Notice: Subject to any disclaimer, the term of this patent is extended or adjusted under 35 U.S.C. 154(b) by 0 days.

(21) Appl. No.: 10/207,746

(22) Filed: Jul. 30, 2002

(65) Prior Publication Data

US 2004/0021293 A1 Feb. 5, 2004

(51) Int. Cl.$^7$ .............................. B60D 1/36; B60D 1/46
(52) U.S. Cl. ............................. 280/479.1; 280/490.1; 280/491.2
(58) Field of Search .............................. 280/477, 478.1, 280/479.1, 479.2, 479.3, 468, 463, 491.23, 490.1, 478

(56) References Cited

U.S. PATENT DOCUMENTS

| | | | |
|---|---|---|---|
| 3,891,239 A | * | 6/1975 | Leo et al. ................ 280/479.1 |
| 4,702,489 A | * | 10/1987 | Erickson .................. 280/479.1 |
| 5,236,214 A | * | 8/1993 | Taylor ........................ 280/402 |
| 5,401,047 A | * | 3/1995 | Dettling, Jr. ............. 280/479.1 |
| 5,772,230 A | * | 6/1998 | Kemnitz .................. 280/491.3 |
| 6,149,180 A | * | 11/2000 | Haws ...................... 280/479.1 |

* cited by examiner

*Primary Examiner*—Anne Marie Boehler
(74) *Attorney, Agent, or Firm*—Henry W. Cummings

(57) ABSTRACT

The improved power hitch of the present invention includes a first cylinder 10 has an extension 9 pivotably mounted at 54 on a transverse cylindrical pin 54 extending between vertical legs 50 and 51 to allow vertical movement, and on a vertical pin 56 to allow limited horizontal movement. Cylinder 10 receives a piston rod 13 extending outwardly therefrom which receives a universal hitch receiver 11. A second cylinder 60 is also mounted on transversely spaced vertical legs 50, 51 at 62. An electric motor 30 pumps fluid from reservoir 32 into cylinder at 64 to move cylinder 12 up and a 66 to move cylinder 12 down.

20 Claims, 5 Drawing Sheets

POWER HITCH

I FIELD OF THE INVENTION

Figure 1:
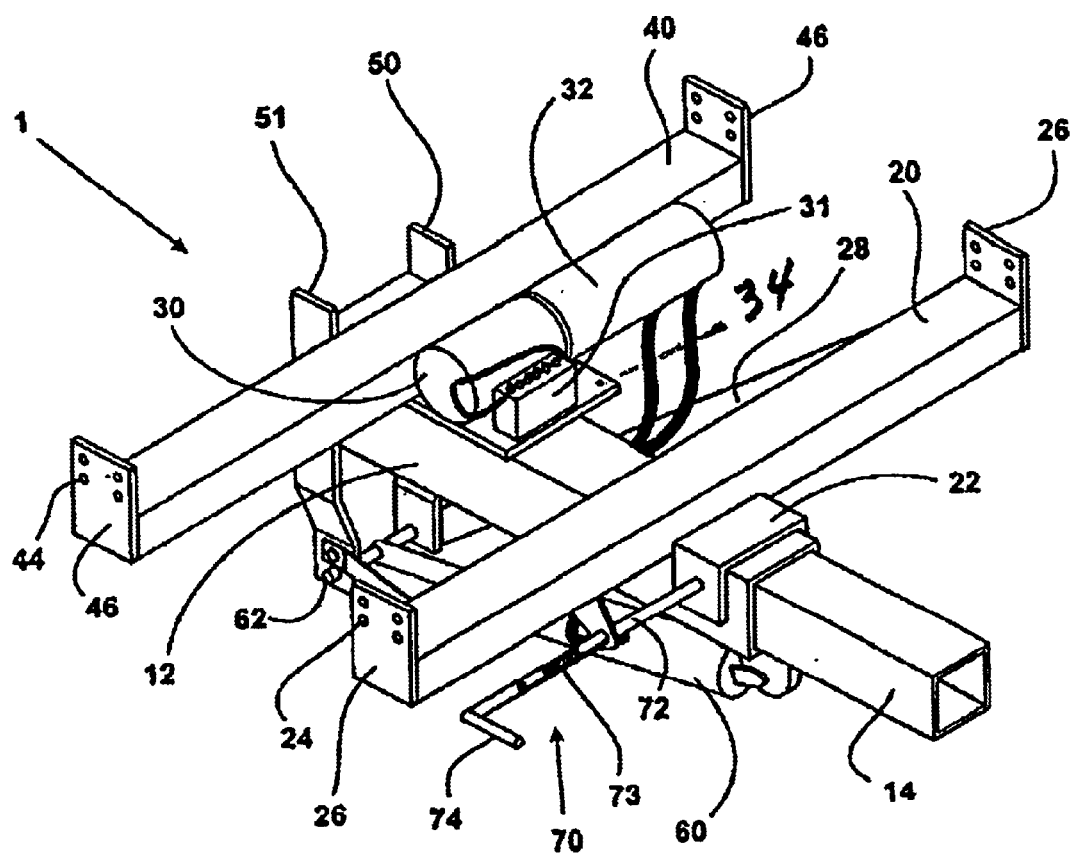

The improved power hitch is an electronically powered, hydraulically driven hitch which has the ability to extend outward from the rear of a vehicle, move horizontally and vertically, connect to a trailer and pull that trailer to a towing vehicle securely.

II BACKGROUND OF THE INVENTION

U.S. Pat. No. 3,891,239 (Leo and Benedict, Apr. 15, 1974) is a hydraulic hitch designed to better enable trucks to tow and position mobile homes. This Patent does not have ability to longitudinally extend or "reach out" and connect to a trailer. The power hitch of the present invention has the ability to perform this function as well as many others due to its mobility along with its adaptability. Furthermore, this patent only utilizes a towing ball, whereas the power hitch of the present invention can be fitted with a ball, a pintle hook, a fifth wheel, or any other connector which can slide into the power hitch's standard sized receiver.

There is another prior art hitch which has been in the public domain for about ten years that is similar to the power hitch of the present invention. This prior art hitch's hydraulic system is powered by the power steering pump of the vehicle, requiring the vehicle's engine to be running during use.

The power hitch of the present invention utilizes an electric motor which allows use of the hitch while the vehicle's engine is turned off, operating more efficiently and conserving energy.

Furthermore, the prior art hitch is welded directly to the frame of its host vehicle, making it part of the vehicle. The power hitch of the present invention is mechanically fastened to the host vehicle, and is removable on demand.

Furthermore, the present invention employs a spring loaded latch pin to prevent fluid from returning to the cylinder 60 instead of the "U" shaped number in the prior construction.

Also, the prior art hitch employs a ball for towering whereas the power hitch is built with a universal receiver, another distinct improvement.

III SUMMARY OF THE INVENTION

A. Objects of the Invention

One object of the present invention is to provide a power hitch which as the ability to longitudinally extend or "reach out" and connect to a trailer or other vehicle to be towed.

Another object of the present invention is to provide a power hitch which can be fitted with a ball, a pintle hook, a fifth wheel or any other connector which can slide into the power hitch's standard size receiver.

Another object of the present invention is to provide a power hitch by which the power hitch utilizes an electric motor which allows the use of the hitch while the vehicle's engine is off, operating more efficiently and conserving energy.

Another object of the present invention is to provide a power hitch which is designed to mechanically fasten to the host vehicle, making it readily removable on demand.

Another object of the present invention is to provide a power hitch which eliminates the need to perfectly position the rear of the towing vehicle directly below the tongue of a trailer hitch by use of a universal receiver with a wide range of motion.

B. Summary

The improved power hitch of the present invention is indicated generally in the Drawings at 1. The hitch includes a first cylinder 12 FIG. 2 having a tubular extension 16 pivotably mounted on a transverse cylindrical pin 54 extending between vertical legs 50 and 51 to allow vertical movement, and on a vertical pin 56 to allow limited horizontal movement. Cylinder 12 receives a piston/cylinder 10 FIG. 4 with a Rod extending outwardly therefrom which receives a universal hitch receiver 14. A second cylinder 60 is mounted on transversely spaced vertical legs 50, 51 at 62 FIGS. 6 & 7. An electric motor 30 pumps fluid from reservoir 32 into cylinder at 64 to move cylinder 12 up and at 66 to move cylinder 12 down. In one embodiment an outer top plate 57 and an outer bottom plate 58 extend between vertical legs 50 and 51 to form a unitary assembly. In another embodiment tube 16 includes a top plate 17, a bottom plate 18 and respective top and bottom rings 17R and 18R for added stability. In another embodiment horizontal pin 54 extends through legs 50 and 51 into ends 54R, 54L. In another embodiment transverse plates 20 and 40, FIG. 5, are attached to the truck frame with respective vertical plates 26 and 46, FIG. 1, having a respective openings 24, 44 to receive fasteners. In another embodiment diagonal supports 28, 29 FIG. 7 extend from pins 53 in respective legs 50 and 51 to support plates 22 and 42.

IV. THE DRAWINGS

FIG. 1 is a perspective view of the improved power hitch of the present invention.

Figure 2:
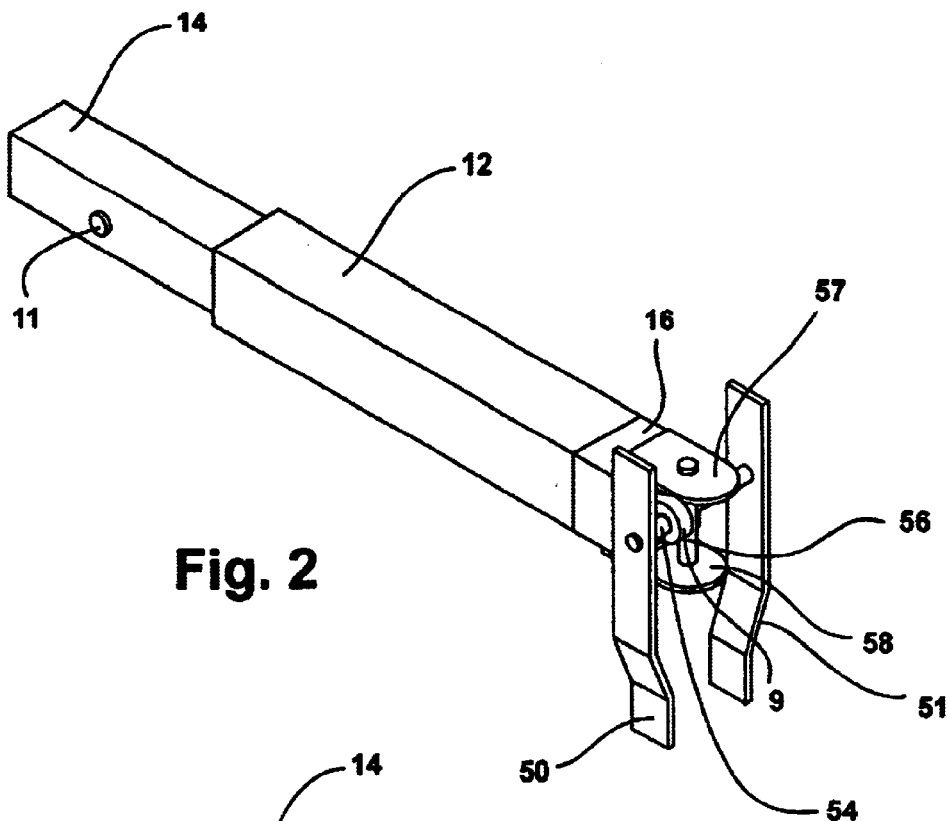

FIG. 2 is a perspective elevation view of the first cylinder assembly in the improved power hitch of the present invention showing an outer top plate 57 and an outer bottom plate 58 extend between vertical legs 50 and 51 to form a unitary assembly.

Figure 3:
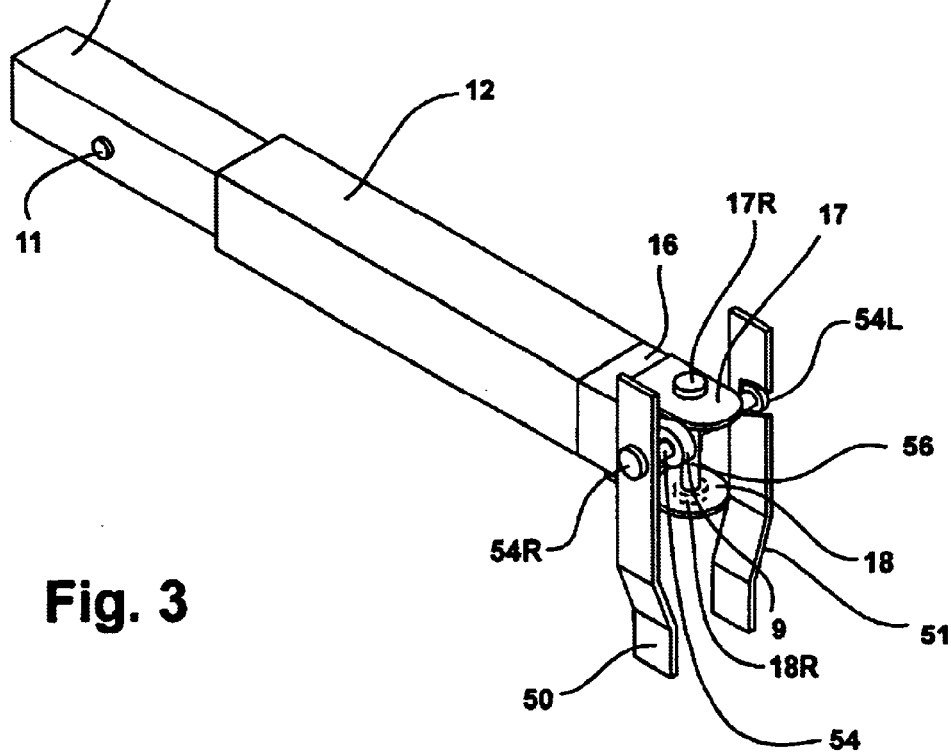

FIG. 3 is a perspective elevation view of the first cylinder assembly in the improved power hitch of the present invention showing horizontal pin 54 extends through legs 50 and 51 into ends 54R, 54L.

Figure 4:
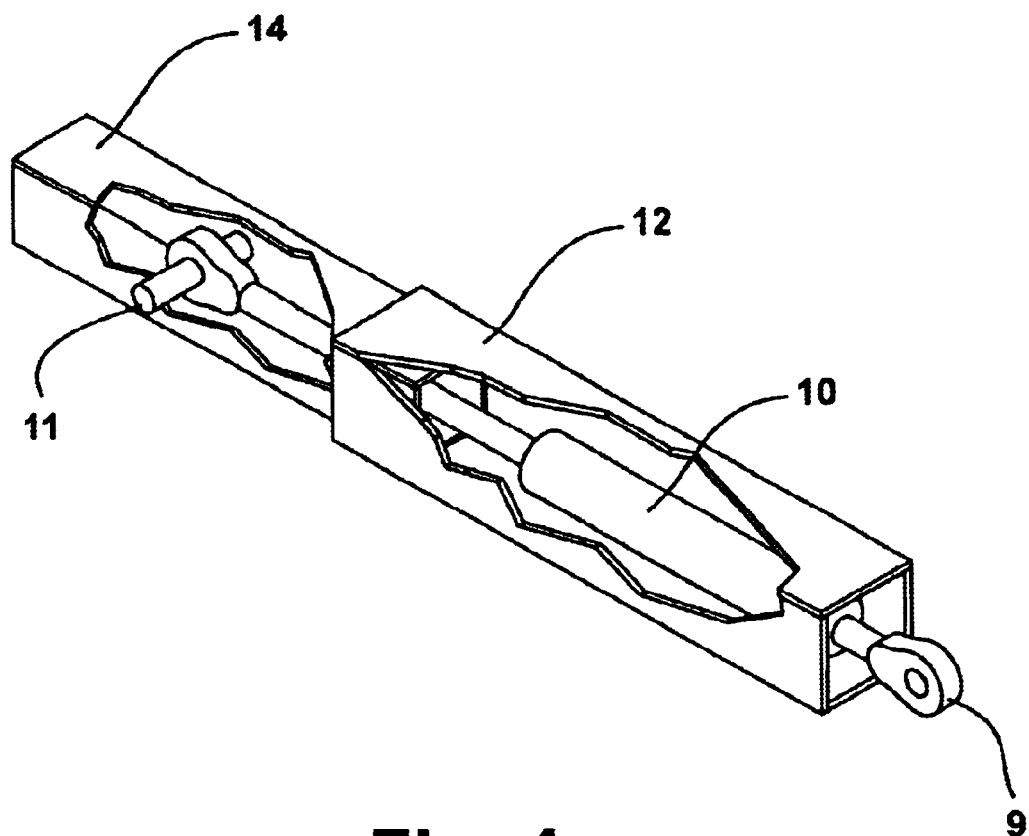
Figure 5:
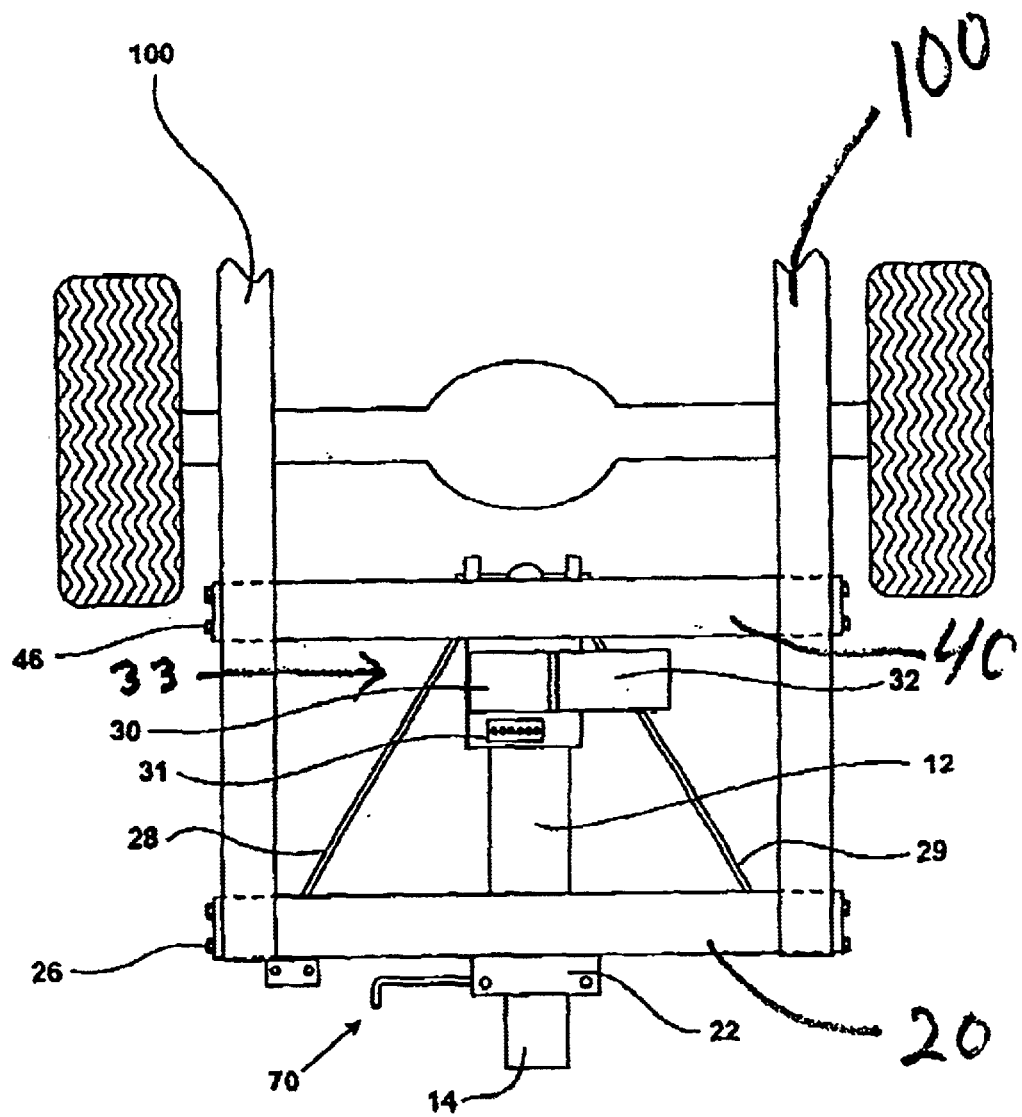

FIG. 4 is a perspective view of the improved power hitch of the present invention showing cylinder assembly 12.

FIG. 5 is a plan elevation view of the improved power hitch of the present invention showing transverse plates 20 and 40, FIG. 5, are attached to the truck frame with respective vertical plates 22 and 42, having respective openings 24, 44 to receive fasteners.

Figure 6:
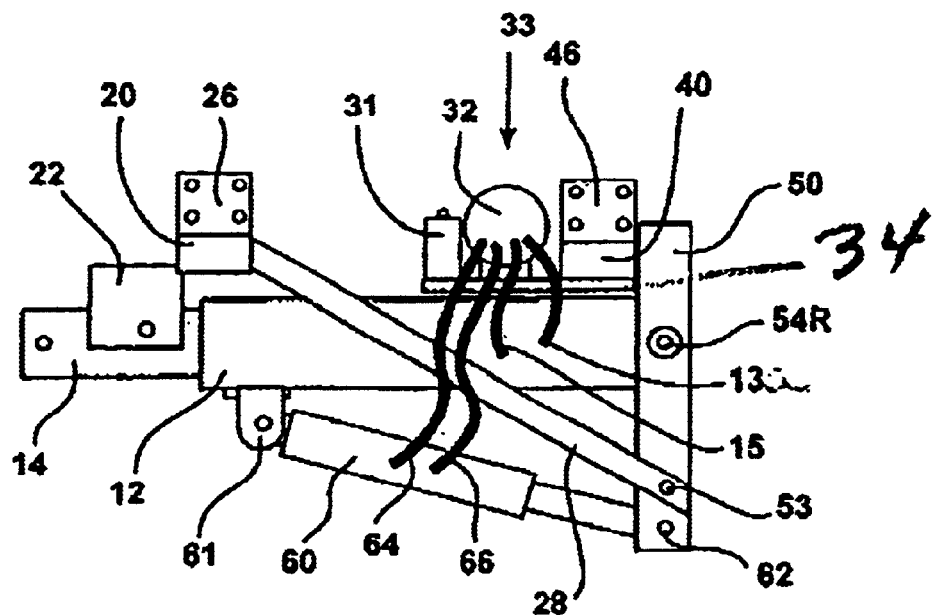

FIG. 6 is a side elevation view of the improved power hitch of the present invention showing first cylinder assembly 12 second cylinder, extension 14, vertical support plates 26 and second assembly 60.

Figure 7:
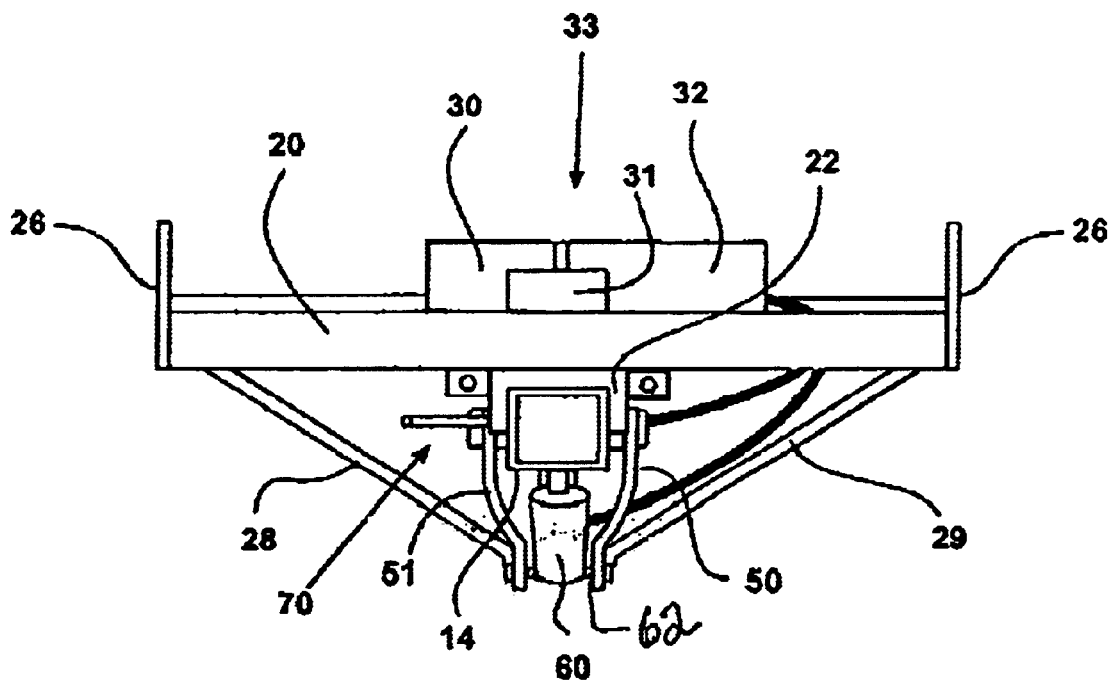

FIG. 7 is an end elevation view of the improved power hitch of the present invention showing second cylinder assembly 60, and diagonal supports 28 and 29.

V. DESCRIPTION OF PREFERRED EMBODIMENTS

The improved power hitch of the present invention is indicated generally in the drawings at 1. The hitch includes a first cylinder 10, FIG. 4, having an end 9 located within a rectangular tube 12 which has a tubular extension 16, FIG. 2. End 9 is pivotably mounted on a transverse cylindrical pin 54 extending between vertical legs 50 and 51 to allow vertical movement, and on a vertical pin 56 to allow limited horizontal movement. Cylinder 10 receives a piston Rod, FIG. 4, extending outwardly from said tube into a smaller rectangular tube 14 which receives a universal hitch receiver 11.

A second cylinder 60, FIGS. 6 and 7, is also mounted on transversely spaced vertical legs, 50, 51 at 62. Hydraulic means 33 including an electric motor 30 mounted on plate 34 pumps fluid from reservoir 32 into cylinder 60 at 64 to move tube 12 up and at 66 to move tube 12 down.

In one embodiment, FIG. 2, an outer top plate 57 and an outer bottom plate 58 extend between vertical legs 50 and 51 to form a unitary assembly.

In another embodiment, FIG. 3, tubular extension 16 includes a top plate 17, a bottom plate 18 and respective top and bottom rings 17R and 18R for added stability.

In another embodiment horizontal FIG. 3, pin 54 extends through legs 50 and 51 into ends 54R, 54L.

In another embodiment, FIGS. 1 and 5, transverse plates 20 and 40 are attached to the truck frame 100 with respective vertical plates 26 and 46 having respective openings 44 to receive mechanical fasteners.

In another embodiment, FIGS. 5–7, diagonal supports 28, 29 extend from pins 53 in responsive legs 50 and 51 to support plates 20.

The means 33 for pumping fluid from the fluid reservoir 32 into the second cylinder 60 to move the first cylinder 10 and tube 12 up and down is separate from the engine and power steering pump of the vehicle. In one embodiment it comprises a commercially available pump 32, and conduits 13a and 15. The electrical power source may comprise at least one battery 31. The electrical power source may also comprise an electrical power source located at the site of operation such as 110, 220, 440 AC, or a DC power source with a transformer.

In another embodiment, FIGS. 5–7, diagonal supports 28, 29 extend from pins 53 in respective legs 50 and 51 to support plates 20.

The means 33 for pumping fluid from the fluid reservoir 32 into the second cylinder 60 to move the first cylinder 10 and tube 12 up and down is separate from the engine and power steering pump of the vehicle. In one embodiment it comprises a commercially available pump 32, and conduits 13a and 15. The electrical power source may comprise at least one battery 31. The electrical power source may also comprise an electrical power source located at the site of operation such as 110, 220, 440 AC, or a DC power source with a transformer.

What is claimed is:

1. An improved power high comprising:
   a first cylinder having a longitudinal extension extending in a first direction pivotably mounted on a transverse cylindrical pin extending between transversely spaced vertical legs to allow vertical movement, and on a vertical pin to allow limited horizontal movement, said first cylinder having a piston rod extending in an opposite direction which receives a universal hitch receiver;
   a second cylinder also mounted on said transversely spaced vertical legs; a fluid reservoir; and mains for pumping fluid from said fluid reservoir into said second cylinder to move said first cylinder up and down.

2. An apparatus according to claim 1 wherein said means for pumping fluid includes an electrical power source and at least one pump.

3. An apparatus according to claim 2 wherein said electrical power source comprises at least one battery.

4. An apparatus according to claim 2 wherein said electrical power source comprises an electrical power source to the site of operation.

5. An apparatus according to claim 1 wherein said longitudinal extension includes extension reinforcing means.

6. An apparatus according to claim 5 wherein said reinforcing means comprises an outer top plate and an outer bottom plate interconnected by said vertical pin to form a unitary assembly.

7. An apparatus according to claim 1 wherein said vertical pin has vertical pin reinforcing means.

8. An apparatus according to claim 7 wherein said vertical pin reinforcing means comprise a top plate and a bottom plate interconnected by said vertical pin.

9. An apparatus according to claim 8 wherein said vertical pin reinforcing means further comprise respective top an bottom rings on said top and bottom plates for added stability.

10. An apparatus according to claim 1 wherein said horizontal pin extends through said vertical legs into respective horizontal pin reinforcing means.

11. An apparatus according to claim 10 wherein said horizontal pin reinforcing means comprise end rings.

12. An apparatus according to claim 1 wherein said power hitch includes transverse reinforcing means.

13. An apparatus according to claim 12 wherein said transverse reinforcing means comprise at least one transverse plate attached to the track frame.

14. An apparatus according to claim 13 wherein at least two longitudinally spaced transverse plates are attached to the truck frame.

15. An apparatus according to claim 14 wherein mechanical fastening means are provided to attach said plates to the truck frame.

16. An apparatus according to claim 15 wherein said mechanical fastening means comprise vertical plates having respective openings to receive fasteners.

17. An apparatus according to claim 14 wherein said transverse reinforcing means comprise diagonal support reinforcing means.

18. An apparatus according to claim 17 wherein diagonal support reinforcing means extend from said vertical legs to said outermost transverse support plate.

19. An apparatus according to claim 18 wherein mechanical fastening means are provided to attach said diagonal support reinforcing means to said outermost transverse support plate.

20. An apparatus according to claim 19 wherein mechanical fastening means are provided to attach said diagonal support reinforcing means to said outermost transverse support plate and said truck frame.

* * * * *

UNITED STATES PATENT AND TRADEMARK OFFICE
CERTIFICATE OF CORRECTION

| | | |
|---|---|---|
| PATENT NO. | : 6,871,868 B2 | |
| APPLICATION NO. | : 10/207746 | |
| DATED | : March 29, 2005 | |
| INVENTOR(S) | : Richard Pogue | |

It is certified that error appears in the above-identified patent and that said Letters Patent is hereby corrected as shown below:

Column 3 line 45 in the preamble of claim 1: delete "high" and replace with --hitch--.

Signed and Sealed this
Twenty-third Day of August, 2011

David J. Kappos
*Director of the United States Patent and Trademark Office*